US005726851A

United States Patent [19]

Knapp

[11] Patent Number: 5,726,851

[45] Date of Patent: Mar. 10, 1998

[54] COAXIAL CABLE FUSE APPARATUS

[75] Inventor: Walter Knapp, Santa Barbara, Calif.

[73] Assignee: Joslyn Electronic Systems Corporation, Goleta, Calif.

[21] Appl. No.: 630,443

[22] Filed: Apr. 10, 1996

[51] Int. Cl.[6] .......... H02H 5/04

[52] U.S. Cl. .......... 361/104; 361/124; 337/159

[58] Field of Search .......... 361/56, 91, 104, 361/111, 119, 124; 174/5 R, 10, 28, 71 C; 333/181–185, 160, 81 A; 337/139, 140, 158, 159, 163, 164, 180, 181, 199, 292, 31, 34, 416, 222, 228, 231, 160, 191

[56] References Cited

U.S. PATENT DOCUMENTS

| | | | |
|---|---|---|---|
| 4,023,071 | 5/1977 | Fussell | 361/56 |
| 4,188,561 | 2/1980 | Pranke et al. | 361/124 |
| 4,199,736 | 4/1980 | McTaggart et al. | 333/17 L |
| 4,335,415 | 6/1982 | Hooberry | 361/104 |
| 4,359,764 | 11/1982 | Block | 361/119 |
| 4,633,359 | 12/1986 | Mickelson et al. | 361/119 |
| 5,224,012 | 6/1993 | Smith | 361/119 |
| 5,278,720 | 1/1994 | Bird | 361/119 |
| 5,384,679 | 1/1995 | Smith | 361/119 |
| 5,508,873 | 4/1996 | Knapp et al. | 361/119 |

OTHER PUBLICATIONS

"TII Coaxial Protection", presented to Protection Engineers Group meeting, Portland, OR, May 18, 1995.

Joslyn Technical Data Sheet for Model 7090 Network Interface Device No Date.

*Primary Examiner*—Ronald W. Leja

*Attorney, Agent, or Firm*—Marshall, O'Toole, Gerstein, Murray & Borun

[57] ABSTRACT

A coaxial cable fuse having a central conductor, an outer conductor disposed coaxially with respect to the central conductor, an insulating medium disposed between the central conductor and the fusible outer conductor, and an insulating layer covering the fusible outer conductor. The outer conductor may be composed of fusible conductor for causing an open circuit to be formed in the outer conductor in response to an electrical current passing through the outer conductor. The open circuit is formed prior to any substantial heating of the exterior insulating layer of the coaxial cable to which the fuse is attached to reduce the likelihood of fire hazard due to heating of the insulating layer. The coaxial cable fuse may be used in an electrical interface apparatus adapted to interconnect a coaxial distribution cable and a premise coaxial cable. The electrical interface apparatus has a housing and a coaxial cable protector with a surge protector and a fail-short mechanism disposed in the housing. The coaxial cable fuse is preferably connected between the coaxial distribution cable and the coaxial cable protector.

29 Claims, 2 Drawing Sheets

COAXIAL CABLE FUSE APPARATUS

BACKGROUND OF THE INVENTION

The invention is directed to a coaxial cable fuse apparatus for reducing fire hazard conditions due to prolonged overvoltage and/or overcurrent surges and to an electrical interface apparatus in which the coaxial cable fuse is disposed.

An electrical interface apparatus in the form of a conventional network interface device is used to interconnect a coaxial drop or distribution cable with a premise coaxial cable. The coaxial distribution cable, which may carry cable television signals for example, is connected to the network interface device, which is typically mounted to the side of a premise, such as a house or apartment building, which is to receive the cable signals. The coaxial distribution cable is conductively interconnected to the premise coaxial cable, which is routed to the interior of the house or apartment building.

Such a conventional electrical interface apparatus may include a surge protector and/or a fail-short mechanism operatively connected between the coaxial distribution cable and the premise coaxial cable. A surge protector is used to protect against overvoltage surges, which may be induced by lightning or a fallen power line contacting the coaxial distribution cable. When connected between an electrical conductor and ground (or neutral), a conventional surge protector conducts electrical current only when an electrical surge having a voltage in excess of a predetermined voltage occurs on the conductor, in which case the surge is transmitted through the surge protector from the conductor to ground.

A surge protector may be provided with a fail-short mechanism, which is a device that protects against prolonged overvoltage surges. When connected between an electrical conductor and ground (or neutral), a fail-short mechanism conducts electrical current only in response to a prolonged overvoltage surge. Once the fail-short mechanism becomes conductive in response to a prolonged overvoltage surge, it remains conductive at all times thereafter, unless it fails due to the inability to carry the fail-short current. Such failure may result when large fail-short currents cause the fail-short mechanism to be destroyed or otherwise become inoperable.

In the past, coaxial distribution cables having a central conductor with a diameter of 20 or 22 gauge AWG (American Wire Gauge) were used. However, it was discovered that coaxial distribution cables with central conductors of those relatively small diameters could become distorted, due to stretching of the cable during installation, for example. That distortion altered the frequency response of the cable, thereby degrading the quality of the cable signals delivered to the network interface device. Currently, the central conductor of coaxial distribution cables has a relatively large minimum diameter, such as 18, 16 or 14 gauge AWG. Premise coaxial cables may have central conductors with a smaller diameter of 20 or 22 gauge AWG.

Conventional coaxial distribution cables and premise coaxial cables are both formed, as a minimum, with an outer conductor of copper or aluminum braid having a thickness of at least about ten thousandths of an inch. Some distribution cables have additional layers of copper or aluminum foils and/or braids. Due to the large current-carrying capacity of which results from such an outer conductor, the use of such cables could present a fire hazard. For example, if a fallen power line were to contact a coaxial distribution cable and cause a large current to pass through the outer conductor of the cable to ground via the network interface device, the outer conductor of the cable may conduct the large current for a relatively long period of time, without fusing open, causing the outside insulating layer of the cable to overheat, distort and/or melt, thereby exposing the outer, current-carrying conductor and presenting a fire hazard.

Conventional network interface devices have also included electrical devices adapted to be connected to one or more twisted-pair telephone lines. Such a network interface device includes one or more telephone bridges, each of which may be composed of a short length of telephone cable, an RJ-11 connector connected to the cable, and a socket in which the RJ-11 connector may be inserted. For each twisted-pair telephone line, a telephone protector having a surge protector and a fail-short mechanism is provided. Fusible stubs in the form of relatively thin copper wire, i.e. 24 gauge AWG, have been used before this invention to prevent relatively large currents from passing through the twisted-pair telephone wires for more than a relatively short period of time. Such stubs have usually been located outside of the network interface device in which the telephone protectors have been provided. While advantageous when used for protecting telephone systems, such stubs are unsuitable for use in coaxial cable systems due to the relatively stringent frequency response requirements of cable systems.

SUMMARY OF THE INVENTION

The present invention is directed to a coaxial cable fuse having a central conductor, an outer conductor disposed coaxially with respect to the central conductor, and an insulating medium disposed between the central conductor and the outer conductor. The outer conductor may be composed of fusible conductive means for causing an open circuit to be formed in the outer conductor in response to an electrical current passing through the outer conductor. The open circuit is formed prior to any substantial heating of the exterior insulating layer of the coaxial cable to which the fuse is attached to reduce the likelihood of fire hazard.

The open circuit is preferably formed in the outer fusible conductor in less than about 15 minutes when a current of 120 amperes is passed through the fusible outer conductor, and in less than about 30 minutes when a current of 60 amperes is passed through the fusible outer conductor.

The fusible outer conductor of the coaxial cable fuse may have a substantially non-fusible conductive portion and a fusible conductive portion conductively coupled to the substantially non-fusible conductive portion, the fusible conductive portion having a thickness less than the thickness of the substantially non-fusible conductive portion.

The coaxial cable fuse may be provided with a fusible central conductor and used with a fail-short mechanism which is operable in a first operating condition, in the absence of an overvoltage, in which the central conductor is conductively isolated from the outer conductor and a second operating condition, in response to a prolonged overvoltage and overcurrent condition, in which the central conductor is conductively coupled to the outer conductor. The fail-short mechanism transitions from the second operating condition to a failure condition in response to a relatively long prolonged overvoltage and overcurrent condition, and the fusible central conductor is designed to cause an open circuit to be formed in the fusible central conductor prior to the fail-short mechanism transitioning to its failure condition.

The coaxial cable fuse of the invention preferably has an insertion loss with a magnitude not greater than about −0.2 decibels over a frequency range of at least about 50 megahertz to at least about 750 megahertz and a return loss having a magnitude of at least about −20 decibels over a frequency range of at least about 50 megahertz to at least about 750 megahertz.

The coaxial cable fuse of the invention may be used in an electrical interface apparatus adapted to interconnect a coaxial distribution cable and a premise coaxial cable. The electrical interface apparatus has a housing and a coaxial cable protector with a surge protector and a fail-short mechanism disposed in the housing. The coaxial cable fuse is preferably connected between the coaxial distribution cable and the coaxial cable protector.

These and other features and advantages of the present invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENTS

Figure 1:
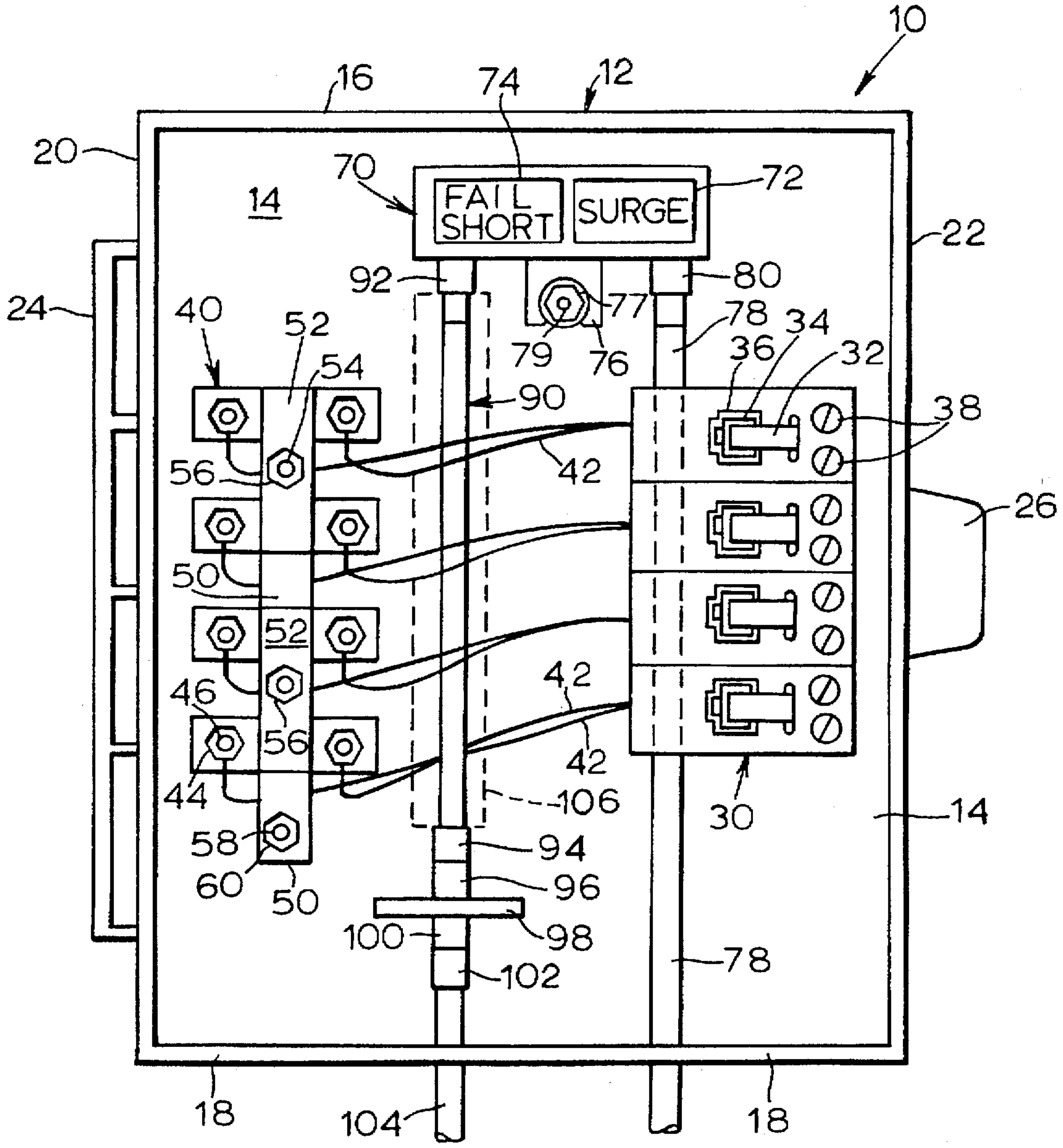
FIG. 1 is a side elevational view of a preferred embodiment of an electrical interface apparatus in accordance with the invention having a coaxial cable fuse incorporated therein.

FIG. 1 is a side elevational view of a preferred embodiment of an electrical interface apparatus in the form of a network interface device 10 in accordance with the invention. The network interface device 10, which is typically mounted to the outside of a premise, such as a house or an apartment building, has a housing 12 composed of an insulating material such as plastic, having a back wall 14 and four side walls 16, 18, 20, 22 integrally formed with and perpendicular to the back wall 14. The left side wall 20 has a cylindrical hinged member 24 integrally formed therewith which is adapted to be hinged to one or more covers (not shown) of the housing 12, and the right side wall 22 has a bracket 26 which may be used to secure the cover(s) in a closed position via one or more screws (not shown).

A number of electrical components are mounted within the interior of the housing 12. These components may include a plurality of conventional telephone bridges 30 each having a length of conventional, four-wire telephone cable 32, a connector 34, such as a conventional RJ-11 connector, attached to the telephone cable 32, and a telephone jack 36 adapted to receive the telephone connector 34.

Each telephone bridge 30 may be connected to one of a plurality of twisted-wire pairs of a premise telephone cable (not shown) via a pair of mounting screws 38. The premise telephone cable passes through a hole in the bottom wall 18 of the housing 12 and is connected to the telephones of the house or apartment building to which the network interface device 10 is mounted. Each telephone bridge 30 is connected to a respective protector device 40 via a pair of wires 42 which are electrically connected between one of the telephone jacks 36 and a pair of mounting terminals in the form of nuts 44 threaded onto screws 46 mounted to one of the protector devices 40.

Each of the protector devices 40 is adapted to be connected to one of a number of twisted-pair lines of a telephone distribution cable via the nuts 44 and screws 46. When connected to the protector devices 40, the telephone distribution cable passes through a hole (not shown) in the bottom wall 18 of the housing 12.

Each of the protector devices 40, which may include a surge protector and a fail-short mechanism (not shown), is conductively connected to a metal ground plate or buss 50 via a number of metal plates 52 and a number of screws 54 and bolts 56 which conductively connect the metal plates 52 to the ground buss 50. The ground buss 50 has a ground terminal in the form of a screw 58 and nut 60 which is adapted to be connected to ground via a ground line (not shown).

When the twisted-pair lines of the telephone distribution cable are connected to the protector devices 40 and the twisted pair lines of the premise telephone cable are connected to the telephone bridges 30, each twisted-pair line of the telephone distribution cable is conductively connected to a respective twisted-pair line of the premise telephone cable, and each twisted-pair line is protected against overvoltage conditions via the surge protector and the fail-short mechanism of each of the telephone protectors 40.

The telephone bridges 30 may be used to test individual telephone lines in a conventional manner to determine the location of a fault condition. This testing may be performed by removing one of the connectors 34 from its telephone jack 36 and inserting the RJ-11 connector attached to a telephone to determine whether a fault is within the telephone wiring of the premise.

The interior of the housing 12 may be provided with a coaxial cable protector 70 having an internal surge protector shown schematically at 72 and an internal fail-short mechanism shown schematically at 74. The coaxial cable protector 70 has a mounting bracket 76 which is mounted to the back wall 14 of the housing 12 via a nut 77 and screw 79, which also function as a grounding terminal which is connected to ground via a ground line (not shown). The coaxial cable protector 70 may have a structure identical to that of the coaxial cable protector U.S. Pat. No. 5,508,873 the disclosure of which is incorporated herein by reference.

The coaxial cable protector 70 has a first terminal which is conductively connected to a premise coaxial cable 78 via a coaxial connector 80 attached to the cable 78. The premise coaxial cable 78 passes through a hole in the bottom wall 18 of the housing 12 and is connected to a cable distribution point (not shown) of the house or apartment to which the network interface device 10 is mounted.

The coaxial cable protector 70 has a second terminal which is conductively connected to a coaxial cable fuse 90 via a coaxial connector 92 attached to the fuse 90. The other end of the coaxial cable fuse 90 has a coaxial connector 94 which is threadably connected to a coaxial connector 96 mounted to a support plate 98 integrally formed with or otherwise connected to the back wall 14 of the housing 12.

The support plate 98 has a second coaxial connector 100 mounted to it which is connected to a coaxial connector 102 of a coaxial distribution cable 104 which passes through a hole formed in the bottom wall 18 of the housing 12. The coaxial distribution cable 104 is composed of (not shown) a central conductor, an outer conductor disposed coaxially with respect to the central conductor, an insulating material disposed between the central and outer conductors, and an insulating layer covering the outer conductor. The diameter of the central conductor is relatively large, typically being at least 14 or 16 gauge AWG, and the outer conductor is braided copper or aluminum having a thickness of at least ten thousandths of an inch.

The impedance of the coaxial cable fuse 90 should be the same as the impedance of the premise coaxial cable 78 and the impedance of the coaxial distribution cable 104, which is typically 50 ohms or 75 ohms. To minimize the amount of broadband signal losses, the fuse 90 may be provided with a connector that mates directly with the connector of the coaxial distribution cable 104.

The housing 12 may have an internal dividing plate (not shown) which physically separates the telephone bridges 30 from the remaining electrical components disposed in the housing 12. The front cover (not shown) of the housing 12 may be provided in the form of a first lockable cover which covers only a portion of the internal components disposed in the housing 12 and a second cover which covers the first cover and the remaining components disposed in the housing 12. Multiple covers may be used to provide selective access to the various electrical components disposed within the housing 12. The particular design of the housing 12 and the front cover(s) is not important to the invention and numerous designs could be utilized. The housing 12 may include other components, such as telephone station protectors, coaxial cable amplifiers, coaxial cable splitters, etc.

During operation of the network interface device 10, the surge protector 72 functions to conductively interconnect the central and outer conductors of the coaxial cable fuse 90 in response to an overvoltage condition in which the voltage between the central and outer conductors exceeds a predetermined voltage, which depends on the particular design of the surge protector 72.

The fail-short mechanism 74 has a first operating condition in which the central and outer conductors of the coaxial cable fuse 90 are conductively isolated and a second operating condition in which the central and outer conductors are conductively coupled together. In the absence of a prolonged overvoltage condition, the fail-short mechanism 74 is in the first operating condition. In the presence of a prolonged overvoltage and overcurrent condition, the fail-short mechanism 74 transitions to its second operating condition. If the overvoltage/overcurrent condition persists for a relatively long period of time (beyond the design limits of the fail-short mechanism), the fail-short mechanism 74 may transition to a failure condition due to its being destroyed or becoming inoperable.

As described below, the central conductor and/or the outer conductor of the coaxial cable fuse 90 are designed to melt or vaporize in the presence of a relatively long prolonged overvoltage condition so that an open circuit is generated, thus preventing large currents from continuing to pass through and significantly heat the fuse 90 and the coaxial distribution cable 104 and cause fire hazards. An open circuit is preferably generated in response to an electrical current of at least about 30 amperes passing through the central conductor and at least about 60 amperes passing through the outer conductor of the fuse 90 prior to significant heating of the distribution cable 104 to reduce the likelihood of fire hazard, and an open circuit is preferably generated prior to any deformation of the outer insulating layer of the distribution cable 104.

When an open circuit is generated in the fuse 90, portions of the fuse 90 may overheat somewhat or be destroyed. To prevent such effects from causing any significant damage or fire hazard within the housing 12, a protective sleeve 106 composed of KAPTON, (by Dupont) a flexible film for electrical insulation, or another fire-retardant material may be disposed over the length of the fuse 90.

Figure 2:
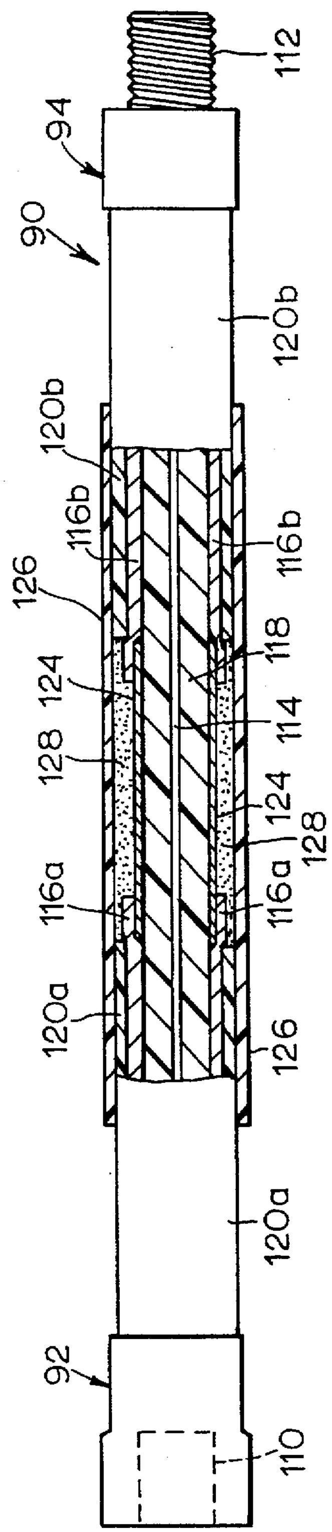
FIG. 2 is a partial cross-sectional view of a first embodiment of a coaxial cable fuse in accordance with the invention.

FIG. 2 illustrates a first embodiment of the coaxial cable fuse 90 in accordance with the invention. Referring to FIG. 2, the coaxial connector 92 disposed at one end of the fuse 90 has an internally threaded portion 110, and the coaxial connector 94 at the other end of the fuse 90 has an externally threaded member 112. The fuse 90, which may be six to eight inches in length, has a fusible central conductor 114 which runs the length of the fuse 90, two substantially non-fusible outer conductive portions **116*a*, 116*b* which are disposed coaxially with respect to the central conductor 114, and a dielectric or insulating material 118 disposed between the central conductor 114 and the outer conductive portions 116*a*, 116*b*. Two annular insulating layer or sheath portions 120*a*, 120*b* cover the outer conductive portions 116*a*, 116*b***.

The central portion of the fuse 90 has a fusible outer conductor 124 disposed coaxially with respect to the central conductor 114. A length of each end of the fusible outer conductor 124 is disposed beneath and overlaps a length of each of the substantially non-fusible conductors **116*a*, 116*b* to ensure that the conductors 116*a*, 116*b* are conductively interconnected. A conductive ring or band (not shown) may be tightly wrapped or similarly disposed about the overlapped portions of the conductors 124, 116*a*, 116*b*** to ensure that they remain in conductive contact.

An outer insulating layer 126 is disposed about the central portion of the fuse 90, and a dielectric or insulating material 128, such as air or silica-type fusing sand, is disposed between the conductive layer 124 and the outer insulating layer 126. The outer insulating layer 126 may be sealed to the outer insulating layers **120*a*, 120*b* via an annular sealing member (not shown) and/or a suitable sealant. The outer insulating layer 126** may be composed of KYNAR, (by Pennwalt) a synthetic resin or pyroelectric film, or a rigid or semi-rigid tube of non-flammable material. If very rigid tubing is used, one or more vent holes may be provided to allow the escape of fusing gases.

The cable 90 of FIG. 2 may be made from a length of conventional RG-59 coaxial cable. Such a cable has a central conductor composed of copper-plated steel having a diameter of 22 or 23 gauge AWG, a coaxial outer conductor in the form of braided copper wire having a braid thickness of about ten thousandths of an inch, a dielectric (e.g. polyethylene) disposed between the central and outer conductors, and an outer insulating sheath. The dielectric layer between the central and outer conductors could also be polyolefin or FEP TEFLON, (by Dupont) synthetic resins containing polymers in the form of extruding combinations.

To form the fuse 90 from the conventional RG-59 cable, a central portion, e.g. a length of about two to three inches, of the outer insulating layer of the cable is removed while leaving intact the two insulating layer portions **120*a*, 120*b*, and then a central length of about one to two inches of the outer conductive layer is removed while leaving intact the two outer conductive portions 116*a*, 116*b*, thus exposing a portion of the internal insulating layer 118**.

An end portion of each of the conductive portions **116*a*, 116*b* is pulled away from the inner insulating layer 118, and the fusible conductive layer 124 is then wrapped tightly around, without wrinkles (so as not to adversely affect the frequency response of the fuse 90), or otherwise applied to, such as by plating or other methods of deposition, the exposed portion of the inner insulating layer 118. After the conductive layer 124 is applied, the two end portions of the conductive portions 116***a*, 116*b* are then replaced over the conductive layer 124, with the conductive rings or bands (not shown) being applied to the overlapping conductive portions 116*a*, 116*b*, 124, and then the outer insulating layer 126 is attached with the dielectric material 128 disposed between the fusible outer conductor 124 and the insulating layer 126. Where fusing sand or another material (other than air) is used for the dielectric material 128, such material is preferably disposed loosely so that some air is present to facilitate fusing of the conductor 124. The fuse 90 so produced has an open-circuit fusing voltage of up to 1,000 volts.

The inventors have investigated the effects of relatively large currents on conventional coaxial cable for prolonged periods of time. When a large current, e.g. 120 amperes, is passed through the outer conductor of a conventional coaxial cable for a long period of time, the outer insulating layer of the cable may first overheat, then deform and/or melt (depending on the particular material used for the outer insulating layer), then disintegrate or vaporize, exposing the outer conductor through which the large current is passing. The outer conductor, which can carry large amounts of currents for long periods of time without open-circuiting due to its relatively large thickness, may become red hot due to the large current passing through it and present a significant fire hazard.

However, when large amounts of current (at least about 30 amperes) pass through the relatively thin conductive layer 124 (which is in actuality much thinner than shown in FIG. 2) of the coaxial cable fuse 90, an open circuit is formed in the conductive layer 124 (via melting and/or vaporization of the layer 124) so that the outer conductive portions 116*a*, 116*b* are conductively isolated from each other, thus preventing further current from passing through the fuse 90. The open circuit forms prior to any substantial heating of the outer insulating layer of the coaxial distribution cable 104 (FIG. 1) to reduce the likelihood of fire hazard.

An open circuit is preferably formed in less than about 15 minutes when a current of 120 amperes is passed through the fusible outer conductor 124 and in less than about 30 minutes when a current of 60 amperes is passed through the fusible outer conductor 124.

When a large current passing through the central conductor 114 triggers the surge protector 72 and then the fail-short mechanism 74, the relatively small diameter of the central conductor 114 (e.g. 22 or 23 gauge AWG) will cause an open circuit to be formed in the central conductor 114 relatively quickly and prior to destruction or inoperability of the fail-short mechanism 74 due to excessive currents passing through it. The fact that an open circuit forms in the central conductor 114 prior to the destruction or inoperability of the fail-short mechanism 74 is advantageous in that the fail-short mechanism 74 maintains the short circuit across the central and outer conductors of the premise coaxial cable 78, thus preventing large voltages and currents from being transmitted into the premise to which the network interface device 10 is mounted.

The coaxial cable fuse 90 of FIG. 2 could be formed from other types of conventional coaxial cables in a similar fashion. For example, one conventional coaxial cable commercially available (via special order in large quantities only) from Belden (Belden #9100) has a thin aluminum layer bonded to the exterior of the inner insulating layer which surrounds the central conductor. A much thicker braided aluminum conductor is disposed adjacent the thin aluminum layer and coaxially with the central conductor. This cable could be modified by removing a portion of the external insulating layer and a portion of the braided aluminum conductor (leaving intact the thin aluminum layer which then acts as a fusible conductive layer), and then applying an insulating layer around the exposed thin aluminum layer. Depending on the desired fusing current, an additional aluminum foil layer may have to be added.

Figure 3:
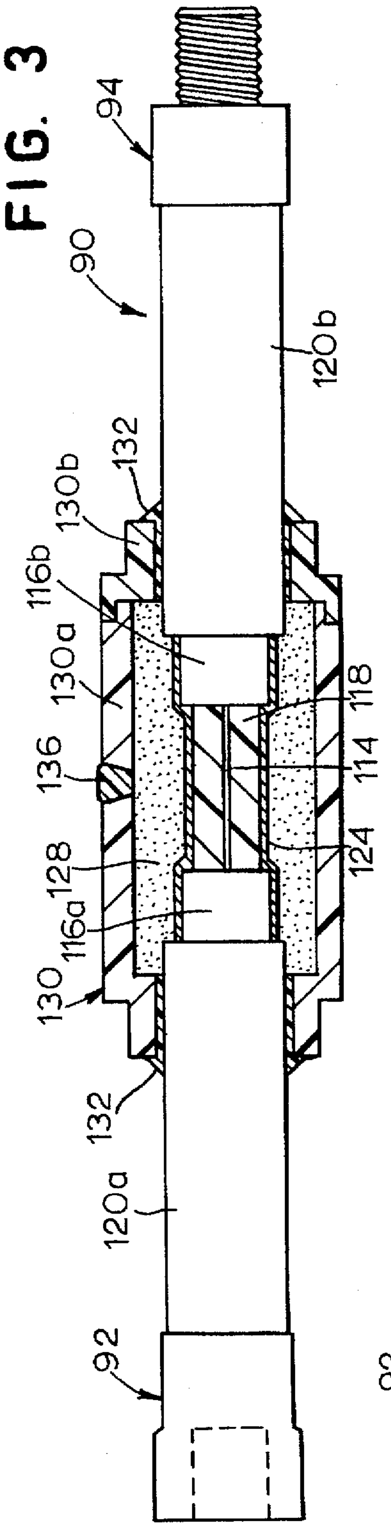
FIG. 3 is a partial cross-sectional view of a second embodiment of a coaxial cable fuse in accordance with the invention.

FIG. 3 illustrates a second embodiment of the coaxial cable fuse 90 in accordance with the invention, which has an open-circuit fusing voltage of greater than 1,000 volts, e.g. 3,000 volts. The fuse 90 of FIG. 3 is the same as the fuse of FIG. 2, except that 1) the fusible outer conductor 124 is wrapped over a portion of the non-fusible outer conductive portions 116*a*, 116*b*, and 2) the insulating layer 126 of FIG. 2 has been replaced with an insulating structure composed of an annular insulating cover 130, which is composed of a cover 130*a* and a closure member 130*b* press-fit or otherwise sealed or connected to the cover 130*a*. The cover 130, which may be sealed to the exterior insulating layers 120*a*, 120*b* via a sealing agent 132 such as RTV, encloses the dielectric material 128 to help extinguish any electrical fusing arcs. The cover 130 may be composed of thermoplastic polyester resin, glass-filled polyester, Velox, or other materials. A venting plug 136 may be provided in the cover 130.

The fusible outer layer 124 of FIG. 3 may be formed of a U-shaped copper foil of about one thousandth of an inch in thickness, which may have a thin conductive adhesive layer. The horizontal portion of the U-shaped foil is wide enough so that it may be wrapped slightly more than one revolution around the insulating layer 118, and the two vertical portions of the U-shaped foil being long enough so that each may be wrapped at least two revolutions around the lengths of the conductive portions 116*a*, 116*b* that extend from the insulating portions 120*a*, 120*b*. The width of each vertical portion of the U-shaped foil could be made to correspond to the amount by which the conductive portions 116*a*, 116*b* extend from the insulating portions 120*a*, 120*b*.

Figure 4:
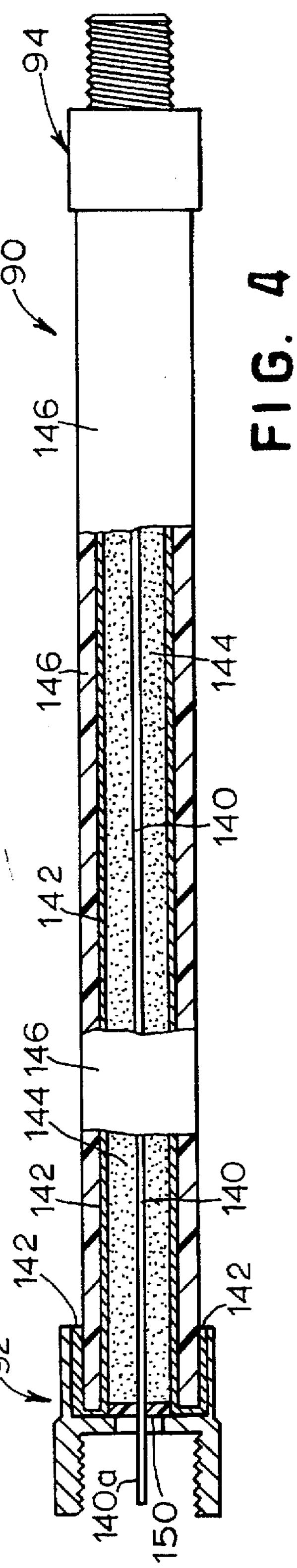
FIG. 4 is a partial cross-sectional view of a third embodiment of a coaxial cable fuse in accordance with the invention.

FIG. 4 illustrates a third embodiment of the coaxial cable fuse 90 in accordance with the invention. Referring to FIG. 4, the fuse 90 has a central conductor 140 composed of 22 or 23 gauge AWG copper-coated steel, a relatively thin, fusible outer conductive layer 142 composed of copper or aluminum having a thickness not exceeding about three thousandths of an inch (preferably one or two thousandths of an inch), and an insulating material 144, such as silica-type fusing sand, disposed between the conductors 140, 142. The fuse 90 is provided with an outer sheath 146 composed of an insulating material such as ceramic or thermoplastic polyester (the outer conductive layer 142 is plated, bonded or otherwise applied to the inner surface of the outer sheath 146).

As shown in the left-hand side of FIG. 4, the conductive layer 142 may be plated or otherwise applied to the portion of the sheath 146 which is disposed within the coaxial connector 92 to insure that the outer conductor 142 makes good conductive contact with the connector 92. An insulating and sealing disk 150 may be provided as part of the connector 92. The portion 140*a* of the central conductor 140 which extends into the connector 92 may be provided with an increased diameter, such as 18 or 20 gauge AWG, to increase its rigidity and durability.

Regardless of the particular structure of the fuse 90 and the material from which it is made, it is preferable that the fusible outer conductive portion fuses (or opens) at a desired time and/or current level. The time and current at which the conductive portion fuses depends upon the fusing constant F of the fuse, which is defined herein in accordance with the following equation:

$$F=(\mu C_p/\rho)(T-T_o)(W\delta)^2,$$

where μ is the mass density of the material used in grams/cm$^3$, $C_p$ is the heat capacity of the material in Joules/gram/°C., ρ is the resistivity in ohm-centimeters, T is the melting point of the material in °C., $T_o$ is the ambient temperature in °C., w is the circumference of the fuse material around the coaxial fuse in centimeters, and δ is the thickness of the fuse material in centimeters.

When copper is used as the fusing material, a fusible outer conductive layer having a thickness of about one or two thousandths of an inch (mils) is preferred, although the preferred thickness could be as large as three thousandths of an inch, depending on the application.

The parameters for a number of possible fusing materials and the maximum fuse thicknesses are set forth in the table provided below. The thickness of each of the materials specified in the table below is based on a fusing constant of 199,000 amperes$^2$-seconds (where w is 0.5 inches (1.27 cm) and where $T_o$ is 20° C.).

| Material | Resistivity (μΩ-cm) | Density (gm/cm$^3$) | Specific Heat (J/gm/°C.) | Melting Point (°C.) | Thickness (mil) |
|---|---|---|---|---|---|
| Aluminum | 2.82 | 2.70 | 0.904 | 659 | 5.89 |
| Bismuth | 120.00 | 9.78 | 0.122 | 271 | 87.18 |
| Copper | 1.72 | 8.96 | 0.385 | 1083 | 3.00 |
| Gold | 2.44 | 19.30 | 0.129 | 1063 | 4.24 |
| Iron | 10.00 | 7.88 | 0.444 | 1530 | 6.02 |
| Lead | 22.00 | 11.34 | 0.128 | 327 | 30.74 |
| Nickel | 7.80 | 8.88 | 0.446 | 1452 | 5.13 |
| Platinum | 10.00 | 21.45 | 0.132 | 1755 | 6.24 |
| Silver | 1.59 | 10.49 | 0.236 | 960 | 3.62 |
| Tin | 11.50 | 7.30 | 0.227 | 232 | 25.03 |
| Zinc | 5.80 | 7.10 | 0.389 | 419 | 10.09 |

It should be noted that the magnitude of the fusing constant for any given material increases as the thickness of the material used in the coaxial fuse increases. A fusing constant of about 200,000 amperes$^2$-seconds is generally the maximum fusing constant in accordance with the invention. A fusing constant substantially greater than 200,000 amperes$^2$-seconds will generally not result in an acceptable fuse, whereas a fusing constant substantially less than 200,000 amperes$^2$-seconds will result in a fuse that fuses more readily.

Because the structure of the fuses 90 described above is substantially identical to the structure of the coaxial cables 78, 104 with which it is used, the fuses 90 have an insertion loss with a magnitude not greater than about −0.2 decibels (dB) over a frequency range of DC to at least about 750 megahertz and a return loss having a magnitude of at least about −20 dB over a frequency range of DC to at least about 750 megahertz.

As used herein, the insertion loss caused by the insertion of a device in a coaxial system is defined in accordance with the following equation:

$$\text{Insertion Loss } (dB)=10 \log P1/P2,$$

where P1 represents the power transmitted to a load with an inserted device and P2 represents the power transmitted to the load without the device. Thus, a device having an insertion loss with a magnitude of −3 dB would cause, by its insertion into a system, the power transmitted to the load to be cut in half. It should be noted that, since P1 will always be less than P2 (for a passive device), the insertion loss will always be a negative number.

The return loss caused by the insertion of a device in a coaxial system is defined in accordance with the following equation:

$$\text{Return Loss } (dB)=20 \log Cr,$$

where Cr is the reflection coefficient, which is the ratio of the reflected voltage caused by the insertion of a device to the initial voltage transmitted towards the device, $V_r/V_i$. For example, where 10% of a forward-travelling wave is reflected by an inserted device (reflection coefficient of 10%), the return loss would be −20 dB. Where only 5.6% of a forward-travelling voltage is reflected by an inserted device, the return loss would be −25 dB. It should be noted that, since the reflection coefficient is always less than one, the return loss will always be a negative number.

As used herein, the term "magnitude" refers to the absolute value of the loss, regardless of the sign of the loss. Thus, for example, an insertion loss of −1 dB has a greater magnitude than an insertion loss of −0.2 dB.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An electrical interface apparatus adapted to interconnect a coaxial distribution cable having an outer insulating layer and a premise coaxial cable, said apparatus comprising:

a housing;

a coaxial cable protector disposed in said housing, said coaxial cable protector comprising:

a surge protector; and a fail-short mechanism;

a coaxial cable fuse disposed in said housing, said coaxial cable fuse comprising:

a central conductor;

a fusible outer conductor disposed coaxially with respect to said central conductor of said fuse; and an insulating medium disposed between said central conductor of said fuse and said fusible outer conductor, said fusible outer conductor comprising fusible conductive means for causing an open circuit to be formed in said fusible outer conductor in response to an electrical current of at least about 30 amperes passing through said fusible outer conductor, said open circuit being formed prior to substantial heating of said outer insulating layer of said coaxial distribution cable to reduce the likelihood of fire hazard due to said substantial heating of said outer insulating layer of said coaxial distribution cable, said surge protector being adapted to conductively interconnect said central conductor and said outer conductor in response to an overvoltage condition, and said fail-short mechanism having a first operating condition in which said central conductor is conductively isolated from said outer conductor and a second operating condition in which said central conductor is conductively coupled to said outer conductor, said fail-short mechanism transitioning to said second operating condition in response to a prolonged overvoltage and overcurrent condition.

2. An apparatus as defined in claim 1 wherein said fusible conductive means causes said open circuit to be formed prior to deformation of said outer insulating layer of said coaxial distribution cable.

3. An apparatus as defined in claim 1 wherein said fusible outer conductor comprises:

a substantially non-fusible conductive portion having a thickness; and wherein said fusible conductive means comprises a fusible conductive portion conductively coupled to said substantially non-fusible conductive portion, said fusible conductive portion having a thickness less than said thickness of said substantially non-fusible conductive portion.

4. An apparatus as defined in claim 1 wherein said central conductor of said fuse comprises a fusible central conductor having a diameter of less than about 20 gauge AWG.

5. An apparatus as defined in claim 4 wherein said fail-short mechanism transitions from said second operating condition to a failure condition in response to a relatively long prolonged overvoltage and overcurrent condition and wherein said fusible central conductor comprises means for causing an open circuit to be formed in said fusible central conductor prior to said fail-short mechanism transitioning to said failure condition.

6. An apparatus as defined in claim 1 additionally comprising a coaxial distribution cable and wherein said coaxial cable fuse is conductively connected between said coaxial distribution cable and said coaxial cable protector.

7. An electrical interface apparatus adapted to interconnect a coaxial distribution cable having an outer insulating layer and a premise coaxial cable, said apparatus comprising:

a housing;

a coaxial cable fuse disposed in said housing, said coaxial cable fuse comprising:

a central conductor;

a fusible outer conductor disposed coaxially with respect to said central conductor; and an insulating medium disposed between said central conductor and said fusible outer conductor, said fusible outer conductor comprising fusible conductive means for causing an open circuit to be formed in said fusible outer conductor in response to an electrical current passing through said fusible outer conductor, said open circuit being formed prior to substantial heating of said outer insulating layer of said coaxial distribution cable to reduce the likelihood of fire hazard due to said substantial heating of said outer insulating layer of said coaxial distribution cable.

8. An apparatus as defined in claim 7 wherein said fusible conductive means causes said open circuit to be formed prior to deformation of said outer insulating layer of said coaxial distribution cable.

9. An apparatus as defined in claim 7 wherein said fusible outer conductor comprises:

a substantially non-fusible conductive portion having a thickness; and wherein said fusible conductive means comprises a fusible conductive portion conductively coupled to said substantially non-fusible conductive portion, said fusible conductive portion having a thickness less than said thickness of said substantially non-fusible conductive portion.

10. An apparatus as defined in claim 7 additionally comprising a coaxial distribution cable and wherein said coaxial cable fuse is conductively connected to said coaxial distribution cable.

11. An apparatus as defined in claim 7 wherein said central conductor comprises a fusible central conductor having a diameter of less than about 20 gauge AWG.

12. An apparatus as defined in claim 11 additionally comprising:

a fail-short mechanism being in a first operating condition in the absence of an overvoltage condition in which said central conductor is conductively isolated from said outer conductor, said fail-short mechanism being in a second operating condition in response to a prolonged overvoltage and overcurrent condition in which said central conductor is conductively coupled to said outer conductor, and said fail-short mechanism transitioning from said second operating condition to a failure condition in response to a relatively long prolonged overvoltage and overcurrent condition, and wherein said fusible central conductor comprises means for causing an open circuit to be formed in said fusible central conductor prior to said fail-short mechanism transitioning to said failure condition.

13. An apparatus as defined in claim 7 wherein said coaxial cable fuse has an insertion loss with a magnitude not greater than about −0.2 decibels over a frequency range of at least about 50 megahertz to at least about 750 megahertz and a return loss having a magnitude of at least about −20 decibels over a frequency range of at least about 50 megahertz to at least about 750 megahertz.

14. A coaxial cable fuse apparatus, comprising:

a central conductor;

a fusible outer conductor disposed coaxially with respect to said central conductor and composed of a material and, for an ambient temperature $T_o$ of 20°, said fusible outer conductor having a fusing constant F of not greater than about 200,000 amperes$^2$-seconds, said fusing constant F being defined in accordance with the following equation:

$$F=(\mu C_p/\rho)(T-T_o)(w\delta)^2,$$

where μ is the mass density of said material in grams/cm$^3$, $C_p$ is the heat capacity of said material in Joules/gram/°C., ρ is the resistivity of said material in ohm-centimeters, T is the melting point of said material in °C., w is a circumference of said fusible outer conductor in centimeters, and δ is a thickness of said fusible outer conductor in centimeters; and an insulating medium disposed between said central conductor and said fusible outer conductor.

15. An apparatus as defined in claim 14 wherein said fusing constant F of said fusible outer conductor is less than 150,000.

16. An apparatus as defined in claim 14 wherein said fusing constant F of said fusible outer conductor is less than 100,000.

17. An apparatus as defined in claim 14 wherein said fusible outer conductor of said coaxial cable comprises:

a substantially non-fusible conductive portion having a thickness; and a fusible conductive portion conductively coupled to said substantially non-fusible conductive portion, said fusible conductive portion having a thickness less than said thickness of said substantially non-fusible conductive portion.

18. An apparatus as defined in claim 14 wherein said central conductor comprises a fusible central conductor having a diameter of less than about 20 gauge AWG.

19. An apparatus as defined in claim 18 additionally comprising:

a fail-short mechanism being in a first operating condition in the absence of an overvoltage condition in which said central conductor is conductively isolated from said outer conductor, said fail-short mechanism being in a second operating condition in response to a prolonged overvoltage and overcurrent condition in which said central conductor is conductively coupled to said outer conductor, and said fail-short mechanism transitioning from said second operating condition to a failure condition in response to a relatively long prolonged overvoltage and overcurrent condition, and wherein said fusible central conductor comprises means for causing an open circuit to be formed in said fusible central conductor prior to said fail-short mechanism transitioning to said failure condition.

20. An apparatus as defined in claim 14 wherein said coaxial cable fuse has an insertion loss with a magnitude not greater than about –0.2 decibels over a frequency range of at least about 50 megahertz to at least about 750 megahertz and a return loss having a magnitude of at least about –20 decibels over a frequency range of at least about 50 megahertz to at least about 750 megahertz.

21. A coaxial cable fuse apparatus, comprising:

a central conductor;

a fusible outer conductor disposed coaxially with respect to said central conductor; and an insulating medium disposed between said central conductor and said fusible outer conductor, said fusible outer conductor comprising fusible conductive means for causing an open circuit to be formed in said fusible outer conductor in less than about 30 minutes when a current of 60 amperes is passed through said fusible outer conductor.

22. An apparatus as defined in claim 21 wherein said central conductor comprises a fusible central conductor having a diameter of less than about 20 gauge AWG.

23. An apparatus as defined in claim 22 additionally comprising:

a fail-short mechanism being in a first operating condition in the absence of an overvoltage condition in which said central conductor is conductively isolated from said outer conductor, said fail-short mechanism being in a second operating condition in response to a prolonged overvoltage and overcurrent condition in which said central conductor is conductively coupled to said outer conductor, and said fail-short mechanism transitioning from said second operating condition to a failure condition in response to a relatively long prolonged overvoltage and overcurrent condition, and wherein said fusible central conductor comprises means for causing an open circuit to be formed in said fusible central conductor prior to said fail-short mechanism transitioning to said failure condition.

24. An apparatus as defined in claim 21 wherein said coaxial cable fuse has an insertion loss with a magnitude not greater than about –0.2 decibels over a frequency range of at least about 50 megahertz to at least about 750 megahertz and a return loss having a magnitude of at least about –20 decibels over a frequency range of at least about 50 megahertz to at least about 750 megahertz.

25. A coaxial cable fuse apparatus, comprising:

a central conductor;

a fusible outer conductor disposed coaxially with respect to said central conductor; and an insulating medium disposed between said central conductor and said fusible outer conductor, said fusible outer conductor comprising fusible conductive means for causing an open circuit to be formed in said outer fusible conductor in less than about 15 minutes when a current of 120 amperes is passed through said fusible outer conductor.

26. An apparatus as defined in claim 25 wherein said central conductor comprises a fusible central conductor having a diameter of less than about 20 gauge AWG.

27. An apparatus as defined in claim 26 additionally comprising:

a fail-short mechanism being in a first operating condition in the absence of an overvoltage condition in which said central conductor is conductively isolated from said outer conductor, said fail-short mechanism being in a second operating condition in response to a prolonged overvoltage and overcurrent condition in which said central conductor is conductively coupled to said outer conductor, and said fail-short mechanism transitioning from said second operating condition to a failure condition in response to a relatively long prolonged overvoltage and overcurrent condition, and wherein said fusible central conductor comprises means for causing an open circuit to be formed in said fusible central conductor prior to said fail-short mechanism transitioning to said failure condition.

28. An apparatus as defined in claim 25 wherein said coaxial cable fuse has an insertion loss with a magnitude not greater than about –0.2 decibels over a frequency range of at least about 50 megahertz to at least about 750 megahertz and a return loss having a magnitude of at least about –20 decibels over a frequency range of at least about 50 megahertz to at least about 750 megahertz.

29. A coaxial cable fuse apparatus, comprising:

a fusible central conductor;

a outer conductor disposed coaxially with respect to said fusible central conductor;

an insulating medium disposed between said central conductor and said fusible outer conductor; and a fail-short mechanism being in a first operating condition in the absence of an overvoltage condition in which said central conductor is conductively isolated from said outer conductor, said fail-short mechanism being in a second operating condition in response to a prolonged overvoltage and overcurrent condition in which said central conductor is conductively coupled to said outer conductor, and said fail-short mechanism transitioning from said second operating condition to a failure condition in response to a relatively long prolonged overvoltage and overcurrent condition, and wherein said fusible central conductor comprises means for causing an open circuit to be formed in said fusible central conductor prior to said fail-short mechanism transitioning to said failure condition.

* * * * *